US012094662B2

(12) United States Patent  
Kurokawa et al.

(10) Patent No.: US 12,094,662 B2  
(45) Date of Patent: Sep. 17, 2024

(54) ELECTROLYTIC CAPACITOR AND METHOD FOR PRODUCING THE SAME

(71) Applicant: PANASONIC INTELLECTUAL PROPERTY MANAGEMENT CO., LTD., Osaka (JP)

(72) Inventors: Akinari Kurokawa, Saga Ken (JP); Norihiko Ogata, Saga Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 409 days.

(21) Appl. No.: 17/298,438

(22) PCT Filed: Nov. 29, 2019

(86) PCT No.: PCT/JP2019/046924  
§ 371 (c)(1),  
(2) Date: May 28, 2021

(87) PCT Pub. No.: WO2020/111278  
PCT Pub. Date: Jun. 4, 2020

(65) Prior Publication Data  
US 2022/0028622 A1  Jan. 27, 2022

(30) Foreign Application Priority Data  
Nov. 30, 2018 (JP) .................... 2018-225594  
Nov. 30, 2018 (JP) .................... 2018-225595

(51) Int. Cl.  
*H01G 9/012*  (2006.01)  
*H01G 9/08*   (2006.01)  
*H01G 9/15*   (2006.01)

(52) U.S. Cl.  
CPC .............. *H01G 9/012* (2013.01); *H01G 9/08* (2013.01); *H01G 9/15* (2013.01)

(58) Field of Classification Search  
CPC ............ H01G 9/15; H01G 9/08; H01G 9/012  
See application file for complete search history.

(56) References Cited

U.S. PATENT DOCUMENTS 5,387,762 A * 2/1995 Hasegawa ......... H01L 23/49555  
                                                                 29/838  
5,554,823 A * 9/1996 Hasegawa ........... H01L 23/3107  
                                                                 361/776

(Continued)

FOREIGN PATENT DOCUMENTS

CN        104603896 A * 5/2015 ............. H01G 9/012  
JP         S59-131144 U    9/1984

(Continued)

OTHER PUBLICATIONS

International Search Report and Written Opinion issued in International Patent Application No. PCT/JP2019/046924, dated Feb. 10, 2020; with partial English translation.

*Primary Examiner* — David M Sinclair  
(74) *Attorney, Agent, or Firm* — Rimon P.C.

(57) ABSTRACT

An electrolytic capacitor including: a capacitor element including an anode section and a cathode section; an anode lead terminal electrically connected to the anode section; a cathode lead terminal electrically connected to the cathode section; and an outer package covering the capacitor element, wherein the anode section includes an anode body, and an anode wire extending outwardly from an implantation face of the anode body, the outer package has a first face opposing the implantation face, and a second face and a third face sharing one side with the first face and opposing each other, an area of the second face is larger than an area of the third face, an angle θ1 formed between the first and second face is less than 90 degrees, and the first face includes a (Continued)

protruding portion located on an extension of the anode wire, and protruding to an outside of the outer package.

11 Claims, 18 Drawing Sheets

(56) References Cited

U.S. PATENT DOCUMENTS

| | | | |
|---|---|---|---|
| 5,952,715 A | | 9/1999 | Sekiguchi et al. |
| 2001/0028544 A1 | | 10/2001 | Sano et al. |
| 2004/0094322 A1 | * | 5/2004 | Kato ................ H01L 23/3107 |
| | | | 174/536 |
| 2009/0059479 A1 | | 3/2009 | Yamashita et al. |

FOREIGN PATENT DOCUMENTS

| | | | | | |
|---|---|---|---|---|---|
| JP | 60220922 | A | * | 11/1985 | |
| JP | 61051752 | U | * | 4/1986 | |
| JP | 01230218 | A | * | 9/1989 | ............ H01G 9/012 |
| JP | H03-061324 | U | | 6/1991 | |
| JP | 03212920 | A | * | 9/1991 | |
| JP | 07022289 | A | * | 1/1995 | |
| JP | H07-22280 | A | | 1/1995 | |
| JP | 08046109 | A | * | 2/1996 | |
| JP | H09-092575 | A | | 4/1997 | |
| JP | H10-149953 | A | | 6/1998 | |
| JP | H11-288844 | A | | 10/1999 | |
| JP | 2001-291641 | A | | 10/2001 | |
| JP | 2006-344775 | A | | 12/2006 | |
| JP | 2007158234 | A | * | 6/2007 | |
| JP | 2008-258602 | A | | 10/2008 | |

* cited by examiner

ELECTROLYTIC CAPACITOR AND METHOD FOR PRODUCING THE SAME

CROSS-REFERENCE OF RELATED APPLICATIONS

This application is the U.S. National Phase under 35 U.S.C. § 371 of International Patent Application No. PCT/JP2019/046924, filed on Nov. 29, 2019, which in turn claims the benefit of Japanese Application Nos. 2018-225594 and 2018-225595, both filed on Nov. 30, 2018, the entire disclosures of which applications are incorporated by reference herein.

TECHNICAL FIELD

The present invention relates to an electrolytic capacitor and a method for producing the same.

BACKGROUND ART

Electrolytic capacitors have a small equivalent series resistance (ESR) and excellent frequency characteristics, and therefore are mounted in various electronic devices. An electrolytic capacitor includes a capacitor element including an anode section and a cathode section, an anode lead terminal electrically connected to the anode section, and a cathode lead terminal electrically connected to the cathode section. The capacitor element is usually sealed by an outer package.

The capacitor element is sealed, for example, by accommodating the capacitor element and materials (an uncured thermosetting resin and a filler) of the outer package in a mold, and performing transfer molding, compression molding, or the like. At this time, side faces of the outer package are designed in a tapered shape, taking into account the releasability of the mold (see PTL 1).

CITATION LIST

Patent Literature

[PTL 1] Japanese Laid-Open Patent Publication No. 2008-258602

SUMMARY OF INVENTION

Technical Problem

With the increase in the number of functions and the reduction in the size of electronic devices, electrolytic capacitors are required to have a higher capacity and a smaller size. However, when side faces of an outer package with a rectangular parallelepiped shape, for example, is formed in a tapered shape, the volume of the outer package becomes smaller than that of an outer package with a rectangular parallelepiped shaped, and therefore the size of the capacitor element that can be sealed by the outer package also becomes smaller.

Solution to Problem

A first aspect of the present invention relates to an electrolytic capacitor including: a capacitor element including an anode section and a cathode section; an anode lead terminal electrically connected to the anode section; a cathode lead terminal electrically connected to the cathode section; and an outer package that covers the capacitor element, wherein the anode section includes an anode body, and an anode wire extending outwardly of the anode body from an implantation face of the anode body, the outer package has a first face opposing the implantation face, and a second face and a third face sharing one side with the first face and opposing each other, the first face, the second face, and the third face each include a planar portion, an area of the second face is larger than an area of the third face, an angle $\theta1$ formed between the planar portion of the first face and the planar portion of the second face is less than 90 degrees, and the first face includes a protruding portion located on an extension of the anode wire, and protruding to an outside of the outer package from the planar portion of the first face.

A second aspect of the present invention relates to a method for producing an electrolytic capacitor, including: a preparation step of preparing a capacitor element to which an anode lead terminal and a cathode lead terminal are connected; a sealing step of forming an outer package that seals the capacitor element, a portion of the anode lead terminal, and a portion of the cathode lead terminal; and a bending step of bending an exposed portion of the anode lead terminal that is exposed from the outer package, wherein a first face of the outer package formed in the sealing step includes a protruding portion protruding to an outside of the outer package, and, in the bending step, the exposed portion of the anode lead terminal is bent using a roller that moves along the protruding portion.

Advantageous Effects of Invention

According to the present invention, it is possible to increase the size of a capacitor element. While the novel features of the invention are set forth in the appended claims, the invention, both as to organization and content, will be better understood and appreciated, along with other objects and features thereof, from the following detailed description taken in conjunction with the drawings.

DESCRIPTION OF EMBODIMENTS

Usually, the outer dimensions of an electrolytic capacitor are strictly defined. Accordingly, in order to increase the capacity of an electrolytic capacitor, it is necessary to increase the size of a capacitor element sealed in the electrolytic capacitor, without changing the outer dimensions of the electrolytic capacitor.

Figure 15:
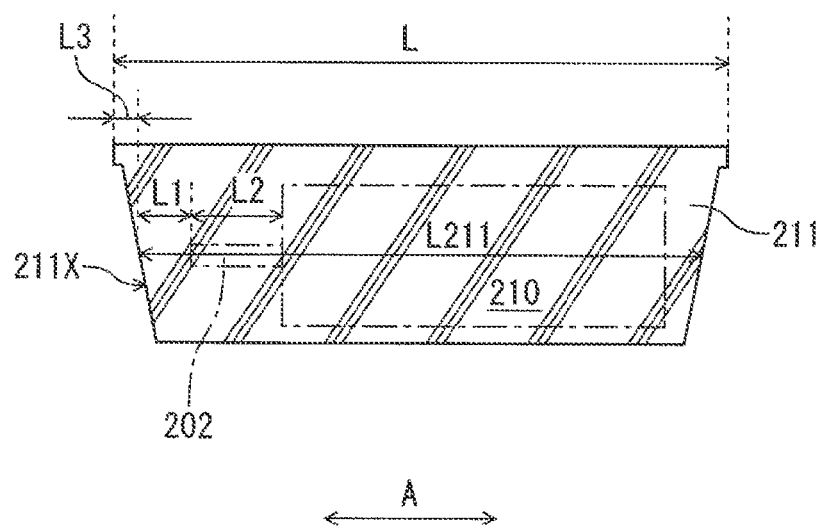
FIG. 15 is a cross-sectional view schematically showing a conventional outer package.

FIG. 15 is a cross-sectional view schematically showing a conventional outer package.

A capacitor element 210 includes an anode wire 202 electrically connected to an anode body and implanted through one face (implantation face) of the anode body. In order to prevent the anode wire 202 from being exposed from the outer package 211, a certain length L1 is secured between the anode wire 202 and a side face 211X of the outer package 211 that is located on an extension of the anode wire 202. In addition, an anode lead terminal, which is not shown, is joined to the anode wire 202. In order to secure a portion to which the anode lead terminal is joined, at least a certain length L2 is also required for the portion where the anode wire 202 is implanted.

However, when the side face 211X has a tapered shape, a length L211, in a longitudinal direction A of the anode wire 202, of the outer package 211 near the portion where the anode wire 202 is disposed, is shorter at least by the length L3 than a design value L of the electrolytic capacitor in the longitudinal direction A. That is, the size of the capacitor element 210 needs to be determined taking also into account the reduced length L3, in addition to the above-described lengths L1 and L2. Accordingly, the length of the capacitor element 210 in the longitudinal direction A is further reduced relative to the design value L.

Therefore, in the present embodiment, a protruding portion is provided on one face (first face) of the outer package that is located on an extension of the anode wire, thus supplementing at least a portion of the L3 reduced by tapering. Consequently, the length of the outer package in the longitudinal direction A of the anode wire approaches the design value L. Accordingly, it is possible to increase the length of the capacitor element in the longitudinal direction A, while securing the above-described lengths L1 and L2. In addition, although the protruding portion is provided on the first face, the other portions of the first face maintain the tapered shape, and therefore the releasability of the mold is less likely to be impaired.

That is, an electrolytic capacitor according to the present embodiment includes: a capacitor element including an anode section and a cathode section; an anode lead terminal electrically connected to the anode section; a cathode lead terminal electrically connected to the cathode section; and an outer package that covers the capacitor element. The anode section includes an anode body, and an anode wire extending outwardly of the anode body from an implantation face of the anode body. The outer package has a first face opposing the implantation face, and a second face and a third face sharing one side with the first face and opposing each other. The first face, the second face, and the third face each include a planar portion. An area of the second face is larger than an area of the third face. An angle θ1 formed between the planar portion of the first face and the planar portion of the second face is less than 90 degrees. The first face includes a protruding portion located on an extension of the anode wire, and protruding to an outside of the outer package.

The area of the second face is greater than the area of the third face, and is, for example, 102% or more, or 105% or more of the third area. The area of the second face may be 120% or less, or 115% or less of the area of the third face. Note that the area in this case does not refer to a surface area, but refers to a projected area as viewed in the normal direction of the second face or the third face (usually, a projected area as viewed from an upper face or a lower face of the electrolytic capacitor).

The first to third faces of the outer package usually means three of six principal faces of an outer surface of the outer package formed to have a substantially rectangular parallelepiped shape. The outer surface of the outer package may also have a fourth face sharing one side with each of the second face and the third face and located opposite to the first face. In this case, the first to fourth faces usually refer to four principal faces of the substantially rectangular parallelepiped shape except for two faces opposing each other. The first to fourth faces each include a planar portion, and the angle formed between two faces of the outer package can be defined from the angles formed between the planar portions. However, the first to fourth faces may include a portion having a curved shape, include some recesses and projections, and/or be formed by a plurality of bent planar faces, as long as they include a planar portion. The first to fourth faces may each include a plurality of planar portions. In that case, the angle formed between the faces are defined using one of the plurality of planar portions that has the largest areas. For example, in FIG. 2, the first face of the outer package includes a plurality of planar portions 11X, 111x, and 112 (and a planar portion coupling 11X and 112). In this case, an angle θ1 formed between the planar portion of the first face and the planar portion of the second face is defined from an angle formed between the planar portion 11X, which has the largest area, of the first face and the planar portion 11Y of the second face.

As described earlier, the angle formed between the first face and the second face (the angle formed between the planar portion of the first face and the planar portion of the second face) is smaller than 90 degrees.

The angle θ1 formed between the planar portion of the first face and the planar portion of the second face is not particularly limited as long as it is less than 90 degrees, and can be set as appropriate taking into account the releasability of the mold and the size of a capacitor element that is to be sealed. The angle θ1 may be 89 degree or less, or 88 degree or less, for example. The angle θ1 may be 80 degrees or more, or 83 degrees or more, for example.

The protruding portion is formed, for example, when assuming a virtual first plane forming an angle θ2 greater than the angle θ1 and less than or equal to 90 degrees with the planar portion of the second face and a virtual third plane coplanar with the planar portion of the third face, in a virtual space between the virtual first plane, the virtual third plane, and the planar portion of the actual first face.

The angle θ2 is not particularly limited as long as it is greater than the angle θ1 and less than or equal to 90 degrees. For example, the angle θ2 may be set such that an angle θ3 formed between the virtual first plane and the virtual third plane is greater than or equal to 90 degrees. When the angle θ3 is less than 90 degrees, the releasability of the mold is likely to be impaired.

Specifically, the angle θ2 may be less than 90 degrees, or less than or equal to 89 degrees. The angle θ2 may be greater than 80 degrees, or greater than 83 degrees.

In another non-limiting embodiment, the electrolytic capacitor according to the present embodiment includes a capacitor element including an anode section and a cathode section, an anode lead terminal electrically connected to the anode section, a cathode lead terminal electrically connected to the cathode section, and an outer package. The outer package has a first face, and a second face and a third face sharing one side with the first face and opposing each other. The outer package covers the capacitor element, with a portion of the anode lead terminal and a portion of the cathode lead terminal exposed therefrom.

The anode lead terminal includes a first anode lead portion along the second face, a second anode lead portion rising from the first anode lead portion and being in contact with the anode section, and a third anode lead portion extending from the first anode lead portion along the first face, further extending along the third face, and exposed from the outer package at least on the third face. A first bent portion may be formed at a boundary between the first anode lead portion and the second anode lead portion, and a second bent portion may be formed at a boundary between the first anode lead portion and the third anode lead portion. The first bent portion is located on the capacitor element side relative to the second bent portion, as viewed in a direction perpendicular to the planar portion of the second face. Here, the first bent portion located on the capacitor element side relative to the second bent portion means that the distance from the first bent portion to the cathode section of the capacitor element is shorter than the distance from the second bent portion to the cathode section of the capacitor element, when the electrolytic capacitor is viewed in a direction perpendicular to the planar portion of the second face.

The cathode lead terminal is usually disposed along the second face, and includes a first cathode lead portion electrically connected to the cathode section. The cathode lead terminal may further include a second cathode lead portion extending from the first cathode lead portion along the fourth face which shares one side with each of the second face and the third face and constitutes an outer face of the outer package opposite to the first face, and further extending along the third face exposed from the outer package at least on the third face.

Note that the anode or cathode lead terminal extending along the first to fourth faces or the planar portions thereof is not limited to a case where the lead terminal extends parallel to each of the faces, while keeping a predetermined separation distance therefrom, but also includes a case where the lead terminal extends, for example, in a direction inclined from a direction parallel to each of the faces. In the case of a face having recessed and projections, the above expression does not mean that the lead terminal extends along the recesses and projections while being bent. For example, a portion of the third anode lead portion that extends along the first face may extend in a direction substantially parallel to the virtual first plane.

The anode lead terminal may integrally include the first anode lead portion, the second anode lead portion, and the third anode lead portion. In this case, the anode lead terminal is in the state of being folded and bent, and is connected to the anode section via the second anode lead portion. In addition, at least a portion of the third anode lead portion is exposed from the outer package. Accordingly, a connection to an external substrate can be established via the third anode lead portion.

The first anode lead portion is disposed along the second face of the outer package, and the second anode lead portion is folded in a direction toward the anode section from a direction along the second face, and is in contact with the anode section. Accordingly, an electrical connection between the anode lead terminal and the anode section may be established by the second anode lead portion. Note that the direction toward the anode section is usually a direction along the first face and/or a direction intersecting the second face, but may be a direction obliquely inclined relative to the first face and the second face.

As a method for connecting the anode section and the anode lead terminal, a method is known that involves making a cut in the anode lead frame, and raising a portion of the anode lead frame so as to be in contact with the anode section (e.g., see Japanese Laid-Open Patent Publication Nos. 2001-126958 and 2015-088718). In this case, an electrical connection between the anode of the electrolytic capacitor and an external substrate is achieved via the first anode lead portion provided on the second face side, and an electrical connection between the cathode of the electrolytic capacitor and the external substrate is established via the first cathode lead portion also provided on the second face side. In this case, it is common that an outer face of the cathode section on the second face side is connected to the first cathode lead portion in order to electrically connect the cathode section and the first cathode lead portion.

In this case, a thickness of the outer package covering the second face side of the cathode section is small. Therefore, it is difficult to extend the first anode lead portion to the side approaching the cathode section of the second face while ensuring necessary insulation between the first anode lead portion and the cathode section, thus making it difficult to increase the area of the first anode lead portion. This problem is pronounced in the case of adopting a method that involves raising a portion of the anode lead frame and using that portion for achieving contact with the anode section, because the area of the first anode lead portion is further reduced by the area of the raised portion.

Therefore, in a non-limiting embodiment of the electrolytic capacitor according to the present embodiment, the remainder of the anode lead terminal after the second anode lead portion has been raised is folded along the outer surface of the outer package, and the third anode lead portion is disposed on the third face located opposite to the second face. This makes it possible to establish an electrical connection between the anode of the electrolytic capacitor and an external substrate via the third anode lead portion. In this case, the shape and the area of the third anode lead portion disposed on the third face are unconstrained by the second anode lead portion that is brought into contact with the anode section. In addition, the aforementioned shape and area can be freely set without being constrained by the arrangement, the shape and the size of the cathode section of the capacitor element. Accordingly, the connection reliability with the external substrate is improved. It is also possible to extend the third anode lead portion along the third face beyond the position of an end of the cathode section on the first face side, as viewed from a direction perpendicular to the second face.

More specifically, the second anode lead portion is formed, for example, by making a cut in a portion, other than the first bent portion, of a contour line of a formation region of the second anode lead portion of the anode lead terminal, folding the second anode lead portion using the first bent portion as an axis, and raising the second anode lead portion so as to be erected from the first principal face. At this time, as a result of raising the second anode lead portion, the anode lead terminal may include, on the second face, a region (opening) in which the anode lead terminal does not extend. In addition, using the second bent portion spaced apart from the first bent portion as an axis, the anode lead terminal is folded along the first face in the same direction as the second anode lead portion, thus forming a third anode lead portion. The third anode lead portion is further folded, at a predetermined position, from the first face along the third face.

The third anode lead portion includes, for example, a first region bent from the first anode lead portion so as to extend in a direction along the planar portion of the first face, and a second region bent from the first region so as to extend along the third face. The third anode lead portion is constituted by the remainder of the anode lead terminal after the second anode lead portion has been formed through bending. In correspondence with the above-described opening, a portion in which the first region extends, and a portion (hereinafter referred to as a third region) in which the first region does not extend may be present on the first face. In the third region, only the outer package is present when the third anode lead portion and the outer package are viewed in the normal direction of the first face (specifically, the normal direction of the planar portion of the first face).

The third region may be a protruding portion protruding outward from the planar portion of the first face. In this case, the first region of the third anode lead portion can be provided around the protruding portion so as to be exposed from the outer package.

For example, when an anode section including an anode body and an anode wire extending from an implantation face of the anode body is used and the anode section and a second anode lead portion are connected to each other, the first face of the outer package opposes the implantation face, and the anode wire extends inside the outer package toward the first face. As this time, the anode wire can be disposed so as to extend toward the third region in which the anode lead terminal does not extend.

Accordingly, it is possible to extend the anode wire toward the protruding portion to the vicinity of the first face of the outer package. The anode wire may be extended such that an end of the anode wire is present inside the protruding portion. By increasing the length of the anode wire extending exposed from the anode body, it is possible to increase the connection reliability between the anode section (anode wire) and the anode lead terminal (second anode lead portion). Furthermore, by placing the cathode section in further proximity to the first face side, it is possible to maximize the volume of the capacitor element in the outer package, so that a high-capacity electrolytic capacitor can be easily obtained.

The third anode lead portion may be exposed from the outer package at least in the second region along the third face. Furthermore, in addition to the second region, the first region along the first face may also be exposed from the outer package. When an electrical connection between the second region and an external substrate is established by soldering, solder can be also attached to the first region, thus making it possible to improve the connection reliability.

Hereinafter, the configuration of an electrolytic capacitor according to an embodiment of the present invention will be described with reference to the drawings. In the present embodiment, an example is illustrated in which an anode section includes an anode body and an anode wire extending from the anode body, and the anode wire is joined to an anode lead terminal. However, the present invention is not limited thereto.

Figure 1:
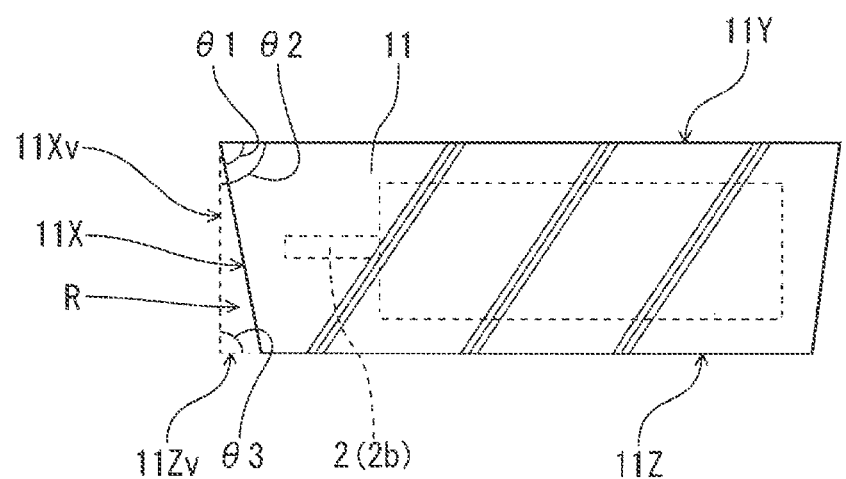
FIG. 1 is a cross-sectional view schematically showing an outer package according to an embodiment of the present invention.

FIG. 1 is a cross-sectional view schematically showing an outer package according to the present embodiment. Note, however, that protruding portions have been omitted for the sake of convenience.

FIG. 1 shows a virtual first plane 11Xv forming an angle θ2 greater than an angle θ1 and less than or equal to 90 degrees with a planar portion 11Y of a second face of an outer package 11, and a virtual third plane 11Zv coplanar with a planar portion 11Z of a third face. The protruding portion is formed, for example, in a virtual space R between the virtual first plane 11Xv, the planar portion 11X of an actual first face, and the virtual third plane 11Zv. However, the protruding portion is provided on an extension of at least an anode section (anode wire) 2. In addition to the above-described protruding portion (hereinafter referral to as a first protruding portion), a protruding portion (second protruding portion) that does not oppose the anode wire 2 may be disposed in the virtual space R.

The first protruding portion is formed, for example, from the second face side relative to a position in the first face that opposes the anode wire, and at least to the third face side relative to the position opposing the anode wire. In particular, the first protruding portion may be formed, from a side (first side) of the first face on the second face side or the vicinity of the first side, to the third face side relative to the position opposing the anode wire. In this case, the outside shape of the outer package, including the first protruding portion, is simplified when the outer package is viewed from the second face side, and the releasability of the mold is further less likely to be impaired.

Such a first protruding portion includes, for example, a protruding face extending toward the virtual third face from the first side or the vicinity of the first side, and a plurality of rising faces connecting the protruding face and the first face. In this case, an angle θ4 (see FIG. 4) formed between the protruding face and the planar portion of the second face is greater than the angle θ1 and less than or equal to the angle θ2. The angle θ4 may be the same as the angle θ2. In this case, the protruding face is coplanar with the virtual first plane.

The angle θ2 and the angle θ4 may both be 89 degrees to 90 degrees. This can maximize the length (L11) of the outer package in the longitudinal direction A, including the first protruding portion, to the extent that the releasability of the mold is not impaired. Accordingly, it is possible to maximize the length of the capacitor element in the longitudinal direction A.

The first protruding portion may extend to reach the above-described virtual third plane. A length T1 (see FIG. 4) of the first protruding portion in the normal direction of the second face (hereinafter may also be referred to as the thickness direction of the outer package) may be, for example, greater than or equal to 60% and less than or equal to 100%, or greater than or equal to 65% and less than or equal to 80%, of the length T of the outer package in the thickness direction between the second face and the third face.

An average length W1 (see FIG. 2) of the first protruding portion in a direction along the first side (hereinafter may also be referred to as the width direction) may be shorter than a length W of the first face in the width direction. The ratio (W1/W) of the length W1 to the length W may be, for example, 60% or less, or 40% or less. W1/W may be 10% or more, or 25% or more. The length W1 of the first protruding portion is calculated by averaging the lengths at three arbitrarily selected locations in the width direction when the first protruding portion is viewed in the normal direction of the first face. The length W of the first face in the width direction is also calculated in the same manner.

Figure 2:
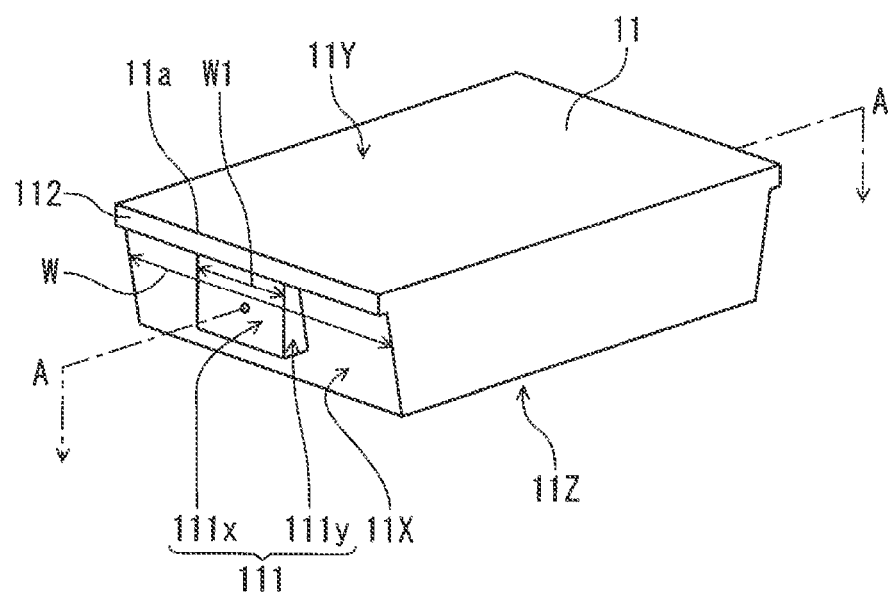
FIG. 2 is a perspective view schematically showing an external appearance of the outer package according to an embodiment of the present invention.
Figure 3:
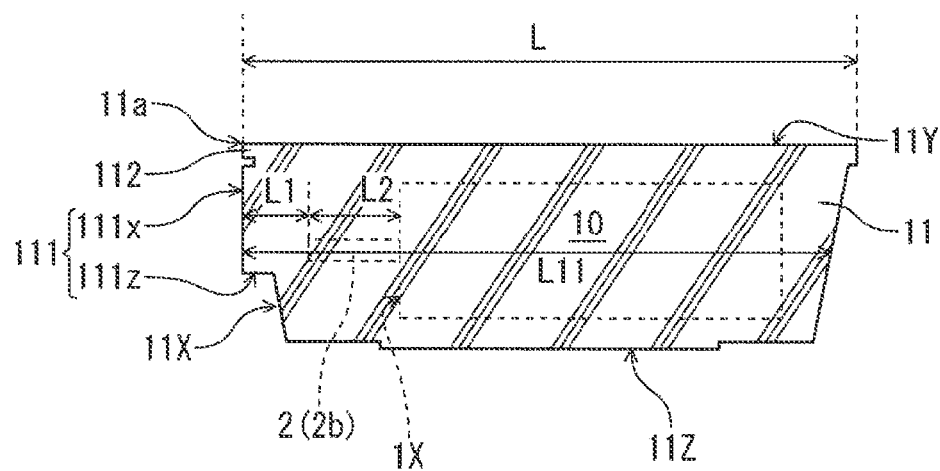
FIG. 3 is a cross-sectional view of the outer package of FIG. 2 taken along the line A-A.
Figure 4:
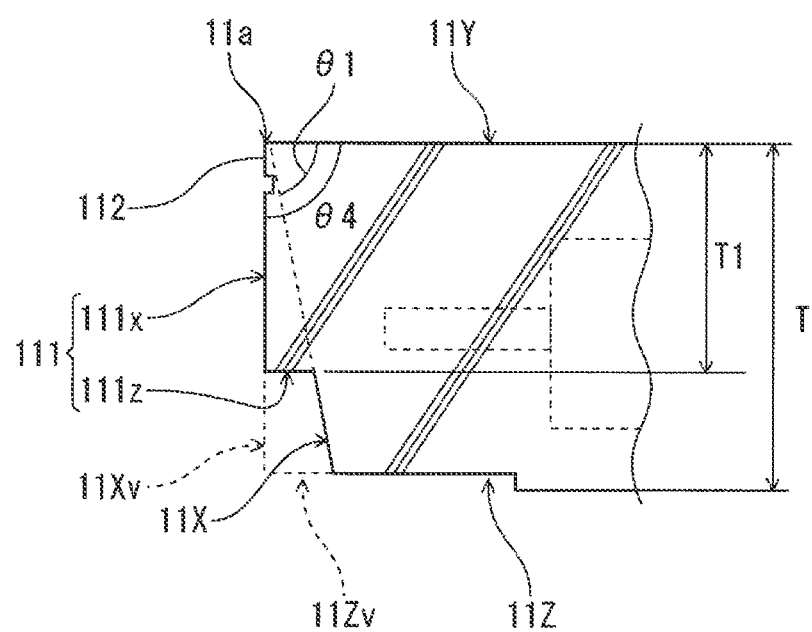
FIG. 4 is an enlarged cross-sectional view of relevant parts of the outer package of FIG. 2 taken along the line A-A.

The outer package according to an embodiment of the present invention will now be described with reference to the drawing. However, the present invention is not limited thereto. FIG. 2 is a perspective view schematically showing an external appearance of an outer package according to an embodiment. FIG. 3 is a cross-sectional view of the outer package of FIG. 2 taken along the line A-A. FIG. 4 is an enlarged cross-sectional view of relevant parts of the outer package of FIG. 2 taken along the line A-A.

The electrolytic capacitor according to the present embodiment includes a capacitor element 10 including an anode section and a cathode section, an anode lead terminal (not shown) electrically connected to the anode section, a cathode lead terminal (not shown) electrically connected to the cathode section, and an outer package 11 that covers the capacitor element 10. The anode section includes an anode body, and an anode wire 2 extending from an implantation face 1X of the anode body.

The outer package 11 has a first face including a planar portion 11X and opposing the implantation face 1X, and a second face and a third face sharing one side with the first face and opposing each other. The second face and the third face include planar portions 11Y and 11Z, respectively. The area of the planar portion 11Y of the second face is about 108% of the area of the planar portion 11Z of the third face, and the angle θ1 formed between the planar portion 11X of the first face and the planar portion 11Y of the second face is about 87 degrees.

The anode wire 2 includes a first portion (not shown) embedded into the anode body through the implantation face 1X, and a second portion 2b extending from the implantation face 1X toward the planar portion 11X of the first face of the outer package 11.

A first protruding portion 111 located on an extension of the second portion 2b of the anode wire, and protruding to the outside of the outer package 11 is formed on the first face. The first protruding portion 111 is formed in a virtual space defined by the planar portion 11X, a virtual first plane 11Xv, and a virtual third plane 11Zv. An angle θ2 formed between the virtual first plane 11Xv and the planar portion 11Y of the second face is about 89 degrees, and an angle θ3 formed between the virtual first plane 11Xv and the virtual third plane 11Zv is about 91 degrees.

The first protruding portion 111 includes a protruding face 111x, and a plurality of rising faces (111y and 111z) connecting the protruding face 111x and the planar portion 11X. The protruding face 111x extends toward the virtual third face 11Zv, from a position located on the second face side relative to a position that opposes the second portion 2b of the anode wire in the vicinity of the first side 11a of the planar portion 11X of the first face on the second face (planar portion 11Y) side, and, to a position to cover a portion of the first face (planar portion 11X) that intersects an extension of the second portion 2b of the anode wire. Although two rising faces 111y and 111z are shown in the illustrated example, the first protruding portion 111 further includes a rising face opposing the rising face 111y.

An angle θ4 formed between the protruding face 111x and the planar portion 11Y of the second face is about 89 degrees, and is greater than the angle θ1 and the same as the angle θ2. That is, the protruding face 111x is coplanar with the virtual first plane 11Xv.

The length T1 of the first protruding portion 111 in the thickness direction of the outer package 11 is about 71% of the length T between the second face 11Y and the third face 11Z in the aforementioned thickness direction. The ratio (W1/W) of the average length W1 of the first protruding portion 111 in the width direction to the length W of the planar portion 11X of the first face in the width direction is about 32%. When the planar portion 11X of the first face is viewed in the normal direction thereof, the ratio (S1/S) of an area S1 of the first protruding portion 111 to an area S of the entire first face is about 23%.

In the present embodiment, the value of the length L11 of the outer package 11 in the longitudinal direction A on an extension of the second portion 2b is set to a maximum value to the extent that the releasability of the mold is not impaired. Accordingly, it is possible to increase the length of the capacitor element 10 in the longitudinal direction A to a maximum value, while securing the length L1 required between the second portion 2b and the first face of the outer package 11 and the length L2 of the second portion 2b required for joining the second portion 2b and the anode lead terminal.

In addition, the first protruding portion 111 is disposed on a portion of the first face, and the other portions of the first face maintain the tapered shape, and therefore the releasability of the mold used when forming the outer package 11 is also less likely to be impaired.

The outer package 11 shown in FIGS. 2 to 4 includes, in addition to the first protruding portion 111, a protruding portion (second protruding portion 112) other than the first protruding portion. The second protruding portion 112 in the illustrated example is formed in a band shape along the above-described first side 11a. Such a second protruding portion 112 contributes to an improvement in the releasability of the mold.

The anode lead terminal joined to the anode wire may be led out from the first face of the outer package. The led-out anode lead terminal is bent, and covers a portion of the third face of the outer package, for example. At this time, the electrolytic capacitor is mounted in an electronic device, with the third face of the outer package opposing the electronic device.

The exposed portion of the anode lead terminal led out from the outer package may be bent along the above-described virtual first plane. In addition, the exposed portion may be bent so as not to overlap the first protruding portion. In this case, it is easier to inhibit the outer dimensions of the electrolytic capacitor from becoming larger than those of the outer package. As a result, the outer package can be made larger, so that the size of the capacitor element can be increased.

Figure 5:
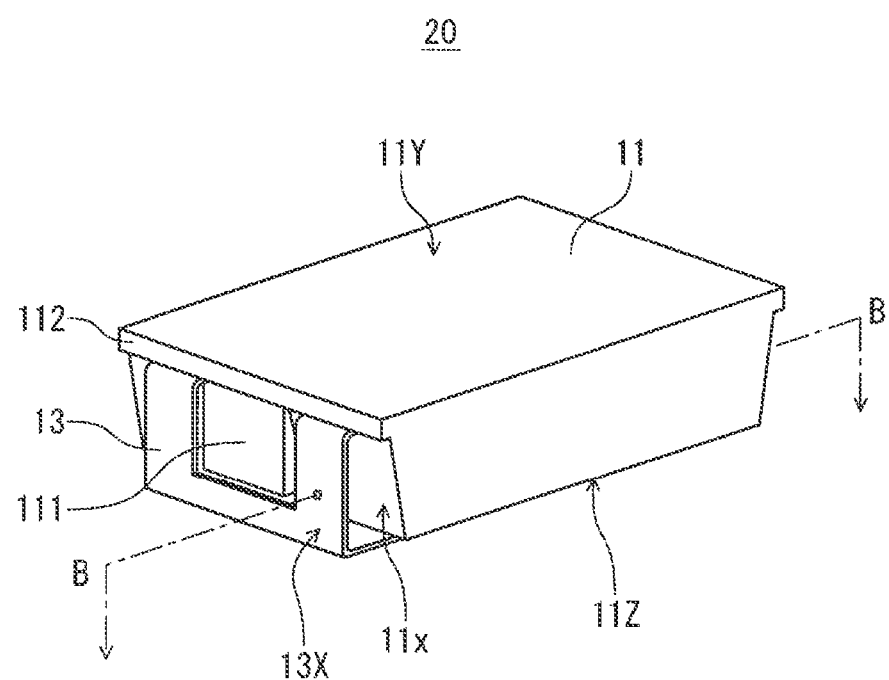
FIG. 5 is a perspective view schematically showing an electrolytic capacitor according to an embodiment of the present invention.
Figure 6:
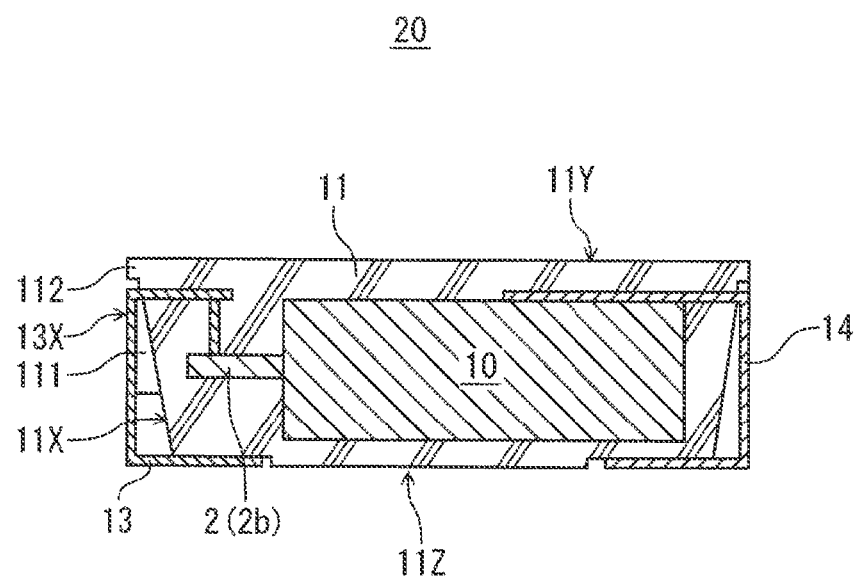
FIG. 6 is a cross-sectional view of the electrolytic capacitor of FIG. 5 taken along the line B-B.

FIG. 5 is a perspective view schematically showing an example of the electrolytic capacitor according to the present embodiment. FIG. 6 is a cross-sectional view of the electrolytic capacitor of FIG. 5 taken along the line B-B. The electrolytic capacitor shown in FIGS. 5 and 6 includes the outer package shown in FIGS. 2 to 4.

The anode lead terminal 13 is led out to the outside of the outer package 11 from the planar portion 11X of the first face. The anode lead terminal 13 led out from the planar portion 11X is bent along the planar portion 11Z of the third face of the outer package 11, after it is bent so that its outwardly facing face (outer face) 13X extends along the virtual first plane 11Xv (see FIG. 4).

At this time, the portion (exposed portion) of the anode lead terminal 13 that is led out from the outer package 11 does not overlap the first protruding portion 111. Furthermore, the protruding face and the outer face 13X of the anode lead terminal are both coplanar with the virtual first plane. Accordingly, the outer dimensions of the electrolytic capacitor 20 are less likely to be larger than those of the outer package 11. In other words, even when the first protruding portion 111 is formed on the outer package 11, and the anode lead terminal 13 is disposed around the outer package 11, it is possible to suppress an increase in the outer dimensions of the electrolytic capacitor 20. Accordingly, it is possible to increase the size of the capacitor element 10.

Similarly, a cathode lead terminal 14 is also led out to the outside of the outer package 11 from a face of the outer package 11 that opposes the planar portion 11X of the first face, and is thereafter bent so as to be disposed on the third face. The cathode lead terminal 14 is joined to the cathode section of the capacitor element 10, using, for example, a conductive adhesive material, which is not shown.

In the illustrated example, the first protruding portion 111 is disposed at substantially the center, in the width direction, of the planar portion 11X of the first face of the outer package 11 so as to correspond to the second portion 2b of the anode wire 2. The anode lead terminal 13 is led out to the outside from two locations of the first face 11X so as to avoid the first protruding portion 111. Thereafter, the two band-shaped portions of the anode lead terminal 13 are coupled in a region on the third face 11Z side on the virtual first face 11Xv.

Thus, an opening surrounding the peripheries of the rising faces of the first protruding portion 111 may be form in the exposed portion of the anode lead terminal 13. As a result of the first protruding portion 111 being accommodated in this opening, an increase in the outer dimensions of the electrolytic capacitor 20 is suppressed. Furthermore, since the length, in the width direction, of the anode lead terminal 13 disposed on the third face is larger than that at the point where the anode lead terminal 13 is led out from the outer package 11, the electrical resistance is reduced, and the joined area of the anode lead terminal 13 and the electronic device, which is not shown, is increased. Accordingly, the connection reliability is improved.

The shape of the first protruding portion, and the shape and the arrangement of the anode lead terminal are not limited thereto.

Figure 7:
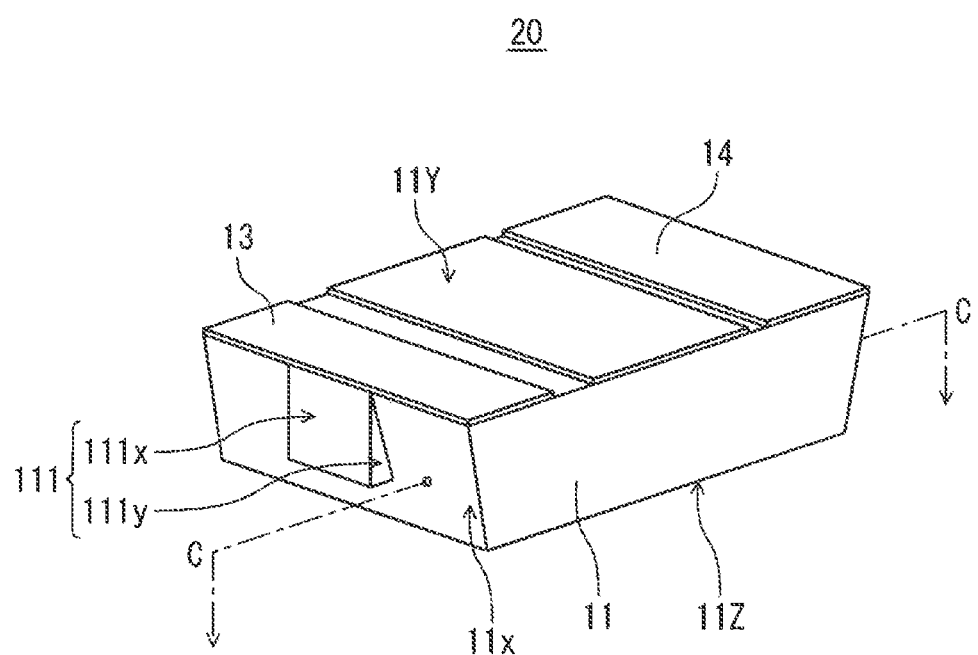
FIG. 7 is a perspective view schematically showing an electrolytic capacitor according to another embodiment of the present invention.
Figure 8:
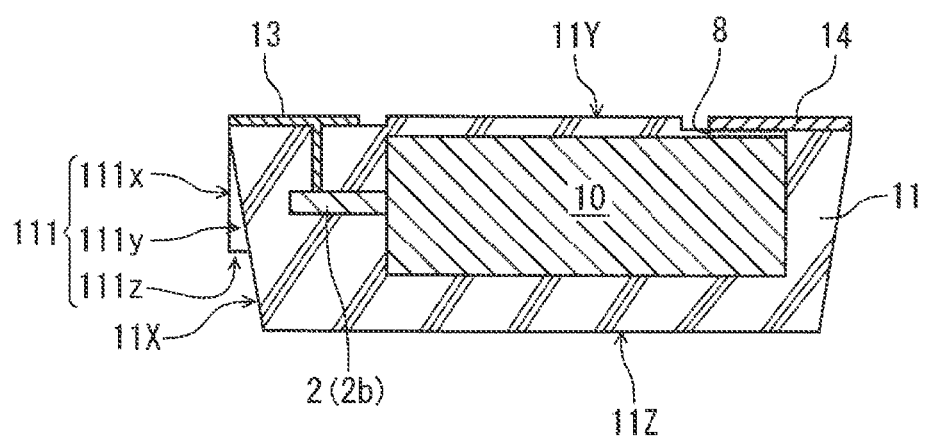
FIG. 8 is a cross-sectional view of the electrolytic capacitor of FIG. 7 taken along the line C-C.

FIG. 7 is a perspective view schematically showing an electrolytic capacitor according to another embodiment. FIG. 8 is a cross-sectional view of the electrolytic capacitor of FIG. 7 taken along the like C-C.

The first protruding portion 111 includes a protruding face 111x, and a plurality of rising faces (111y and 111z) connecting the protruding face 111x and the planar portion 11X of the first face. The protruding face 111x is extends from a portion of the first side 11a in the vicinity of the center of the first side 11a, and thereafter extends toward the virtual third plane 11Zv to a position to cover a portion of the first face (planar portion 11X) that intersects an extension of the second portion 2b of the anode wire, while the length thereof in the width direction constant is kept constant. The outer package 11 does not include the second protruding portion. Except for the foregoing, the outer package shown in FIGS. 7 and 8 has the same configuration as the outer package shown in FIGS. 2 to 4.

The anode lead terminal 13 is led out to the outside of the outer package 11 from the second face. The anode lead terminal 13 led out from the second face is directly disposed on the second face. In this case as well, the anode lead terminal 13 does not overlap the first protruding portion 111, and therefore the outer dimensions of the electrolytic capacitor 20 is less likely to be larger than those of the outer package 11. Accordingly, it is possible to increase the size of the capacitor element 10.

Similarly, the cathode lead terminal 14 may also be led out to the outside of the outer package 11 from the second face, and be disposed directly on the second face. The cathode lead terminal 14 is joined to the cathode section of the capacitor element 10, for example, using a conductive adhesive material 8. The conductive adhesive material 8 is, for example, a mixture of a thermosetting resin and carbon particles or metal particles, which will be described later.

Figure 9A:
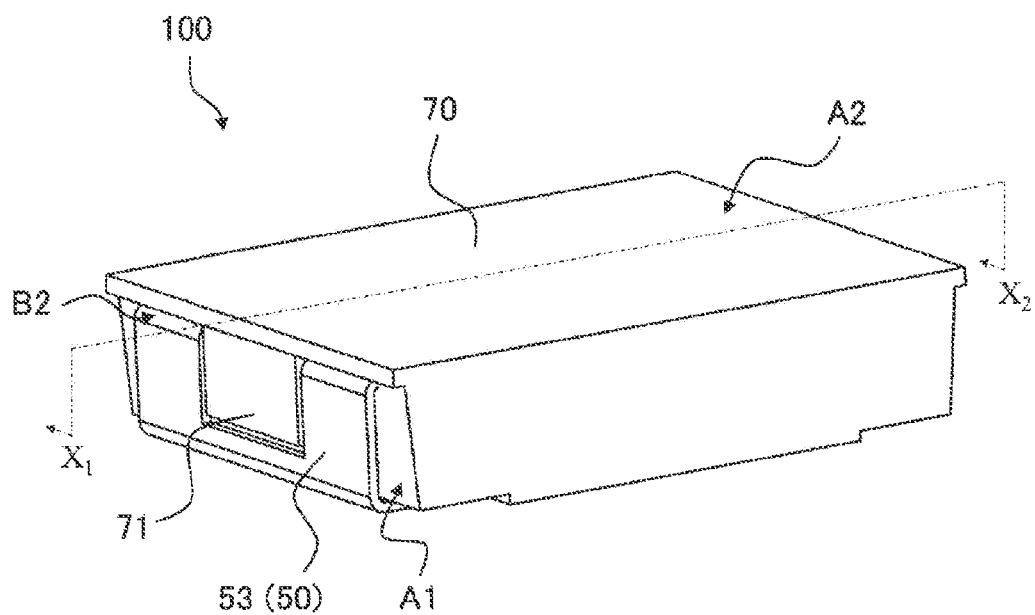
FIG. 9A is a perspective view schematically showing an electrolytic capacitor according to another embodiment of the present invention.
Figure 9B:
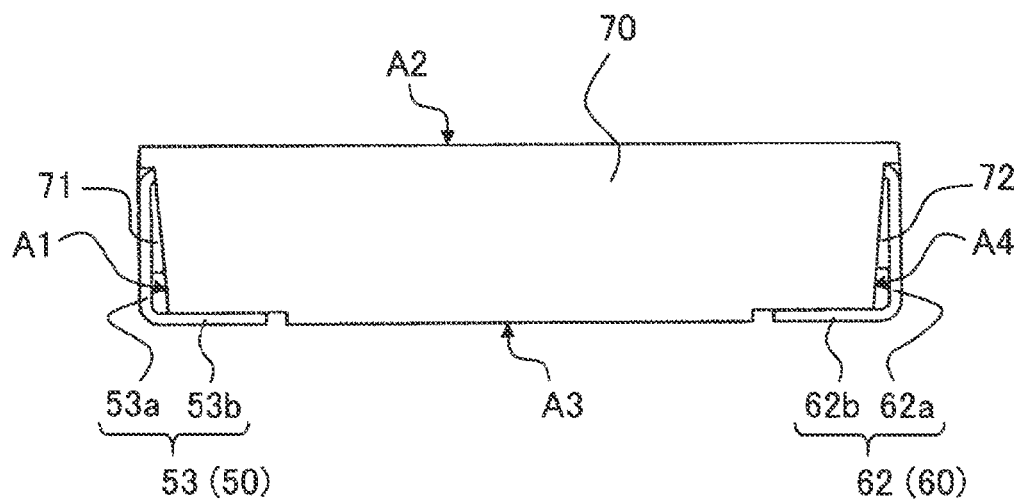
FIG. 9B is a cross-sectional view of the electrolytic capacitor of FIG. 9A taken along the line $X_1$-$X_2$.
Figure 10A:
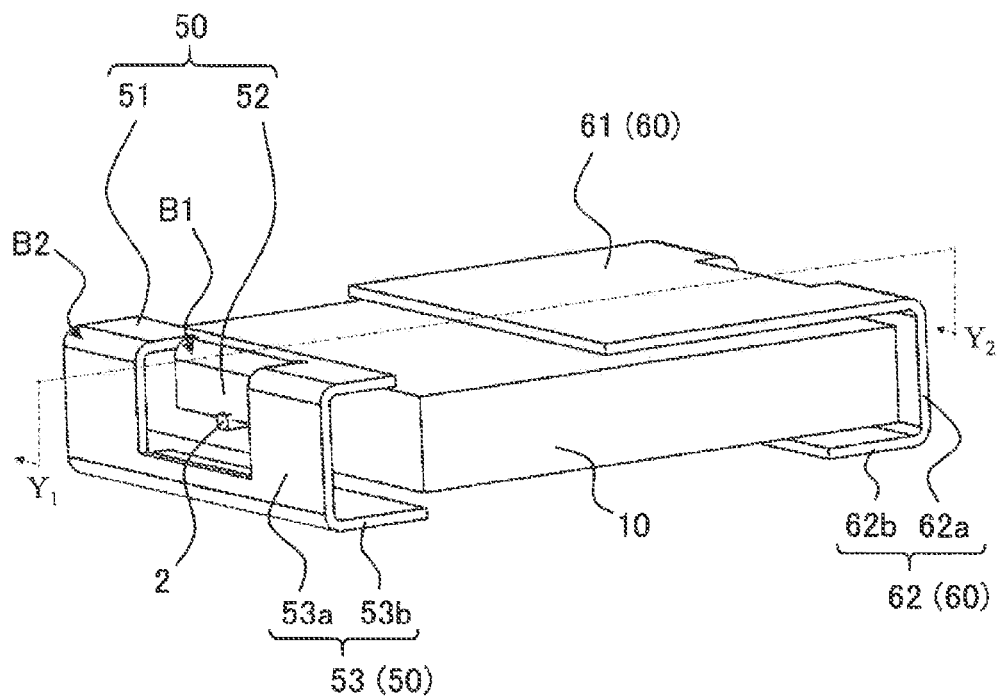
FIG. 10A is a perspective view showing how an anode lead terminal and a cathode lead terminal are connected to a capacitor element in FIG. 9A, with the illustration of an outer package being omitted.
Figure 10B:
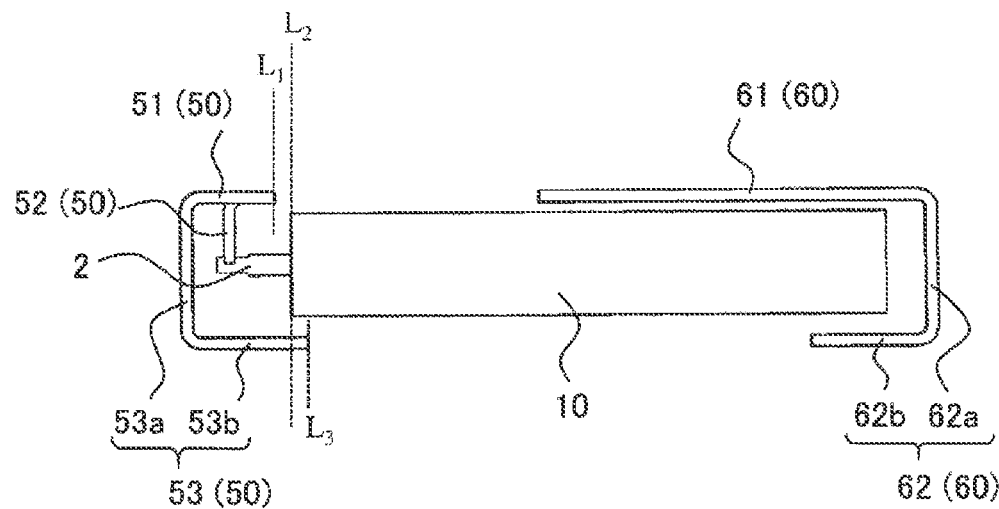
FIG. 10B is a cross-sectional view of the electrolytic capacitor of FIG. 10A taken along the line $Y_1$-$Y_2$.

An electrolytic capacitor according to an embodiment of the present invention, in particular, an embodiment of an anode lead terminal and a cathode lead terminal, will be described in detail with reference to the drawings. However, the present invention is not limited thereto. FIG. 9A is a perspective view schematically showing an electrolytic capacitor 100 according to an embodiment of the present invention. FIG. 9B is a cross-sectional view of the electrolytic capacitor 100 of FIG. 9A taken along the line $X_1$-$X_2$. FIGS. 10A and 10B are diagrams showing how an anode lead terminal 50 and a cathode lead terminal 60 are connected to a capacitor element 10 in FIGS. 9A and 9B, respectively, with the illustration of the outer package 70 being omitted. FIG. 10B is a cross-sectional view of the electrolytic capacitor of FIG. 10A taken along the line $Y_1$-$Y_2$.

The electrolytic capacitor 100 includes a capacitor element 10 including an anode section 6 and a cathode section 7, an anode lead terminal (anode lead frame) 50 electrically connected to the anode section 6, a cathode lead terminal (cathode lead frame) 60 electrically connected to the cathode section 7, and an outer package 70. The outer package 70 covers the capacitor element 10, with a portion of the anode lead terminal 50 and a portion of the cathode lead terminal 60 being exposed. The anode section 6 includes an anode body 1 and an anode wire 2 extending from the anode body 1, and the anode wire 2 is joined to the anode lead terminal 50.

The outer surface of the outer package 70 includes a first face A1, a second face A2 sharing one side with the first face A1, a third face A3 sharing one side with the first face A1 and located opposite to the second face A2, and a fourth face A4 sharing one side with each of the second face A1 and the third face A3. The fourth face A4 is located opposite to the first face A1 (see FIG. 9B).

The anode lead terminal 50 includes a first anode lead portion 51, a second anode lead portion 52, and a third anode lead portion 53. The third anode lead portion 53 further includes a first region 53a extending in a direction along the first face A1 (more specifically, a direction along the virtual first plane), and a second region 53b bent from the first region 53a so as to extend along the third face A3 (see FIGS. 10A, 10B).

As shown in FIG. 10A, the anode lead terminal 50 is folded from the first face A1 at a first bent portion B1 and a second bent portion B2. A portion of the anode lead frame 50 is folded at the first bent portion B1 in a direction toward the anode wire 2, and constitutes the second anode lead portion 52. Another portion of the anode lead terminal 50 is folded along the first face A1 at the second bent portion B2, and constitutes the third anode lead portion 53. The remainder of the anode lead frame 50 that extends along the second face A2 constitutes the first anode lead portion 51. The second anode lead portion 52 is connected to the anode wire 2.

In the present embodiment, as shown in FIG. 9B, the whole of the third anode lead portion 53 is exposed from the outer package 70, and the third anode lead portion 53 extends from the second bent portion B2 along the first face A1 so as to cover the first face A1 in the first region 53a, and is thereafter folded in the vicinity of a boundary between the first face A1 and the third face A3 toward a direction along the third face A3, and extends along the third face A3 so as to cover the third face A3 in the second region 53b.

The first bent portion B1 is located on the capacitor element 10 side relative to the second bent portion B2. That is, the second anode lead portion 52 is folded at a position closer to the cathode section of the capacitor element than the third anode lead portion 53 is. Due to this, the anode lead terminal 50 has an opening formed on the first face side as shown in FIG. 10A. The first region 53a exposed from the outer package 70 does not cover the entire surface of the first face, and a region in which the anode lead terminal 50 (third anode lead portion 53) is not exposed is present in a region (third region) on the first face that corresponds to the above-described opening.

As shown in FIG. 9A, a protruding portion (first protruding portion) 71 is provided in a region on the first face that corresponds to the above-described opening, and the first region 53a extends so as to surround the protruding portion 71. The anode wire 2 extends toward the protruding portion 71 (see FIG. 10A; however, the protruding portion 71 is not shown in FIG. 10A).

The cathode lead terminal 60 includes a first cathode lead portion 61 and a second cathode lead portion 62. A portion of the cathode lead terminal 60 is folded from the second face A2 along the fourth face A4, and the folded portion constitutes the first cathode lead portion 61, and the remainder constitutes the second cathode lead portion 62. The first cathode lead portion 61 is electrically connected to the cathode section of the capacitor element 10 via a conductive adhesive (e.g., silver paste), which is not shown, on the second face A2 side. The second cathode lead portion 62 further includes a first region 62a extending in a direction along the fourth face A4, and a second region 62b bent from the first region 62a so as to extend along the third face A3. As shown in FIG. 10B, the whole of the second cathode lead portion 62, including the first region 62a and the second region 62b, is exposed from the outer package 70.

In the example shown in FIG. 10A, similarly to the anode lead terminal 50, the cathode lead terminal 60 also has an opening formed on the fourth face A4 side. The first region 62a of the cathode lead terminal 60 exposed from the outer package 70 does not cover the entire surface of the fourth face A4, and a region in which the cathode lead terminal 60 (second cathode lead portion 62) is not exposed is present in a region on the fourth face that corresponds to the above-described opening. A protruding portion 72 is provided in the region on the fourth face that corresponds to the above-described opening, and the first region 62a is formed so as to surround the protruding portion 72.

The distance from the second face A2 on which an electrical connection between the cathode lead terminal 60 and the cathode section is established, to the capacitor element 10 (i.e., the thickness of the outer package that covers the second face A2 side of the cathode section) is usually smaller than the distance from the third face A3 of the outer package to the capacitor element 10 (i.e., the thickness of the outer package that coves the third face A3 side of the cathode section). For this reason, from the viewpoint of ensuring insulation between the cathode section and the anode lead terminal 50, there is a need to ensure a certain separation distance between an end position L1 of the first anode lead portion 51 and an end position L2 of the cathode section of the capacitor element on the first face side, shown in FIG. 10B. Additionally, in the present embodiment, the area of the first anode lead portion 51 is reduced as a result of providing the second anode lead portion 52. Consequently, the area of the first anode lead portion 51 is limited by the arrangement of the second anode lead portion and the cathode section, and it is therefore necessary to take measures to increase the land area for connection to an external substrate.

As a method for ensuring insulation between the cathode section and the anode lead terminal 50, it is conceivable to increase the thickness of the outer package that covers the second face A2 of the cathode section by bending the first cathode lead portion 61 in the outer package 70. However, the volume occupied by the capacitor element is reduced by an amount corresponding to the increase in the thickness of the outer package, resulting in a reduced capacity.

However, in the electrolytic capacitor 100 according to the present embodiment, an electrical connection between the electrolytic capacitor and an external substrate is established on the third face A3, which is located opposite to the second face A2 on which an electrical connection between the cathode lead terminal 60 and the cathode section is established. Therefore, the shape and the area of the third anode lead portion 53 are not dependent on the arrangement of the cathode section, and can be set freely. As shown in FIG. 10B, it is possible that an end position L3 of the third anode lead portion 53 is set at a position to overlap the cathode section beyond L2. Accordingly, it is possible to increase the area of the third anode lead portion 53 without causing a capacity decrease, and also improve the connection reliability with the external substrate.

<Capacitor Element>

A capacitor element according to the present embodiment will be described in detail, taking, as an example, a case where a solid electrolyte layer is included as an electrolyte.

Figure 11:
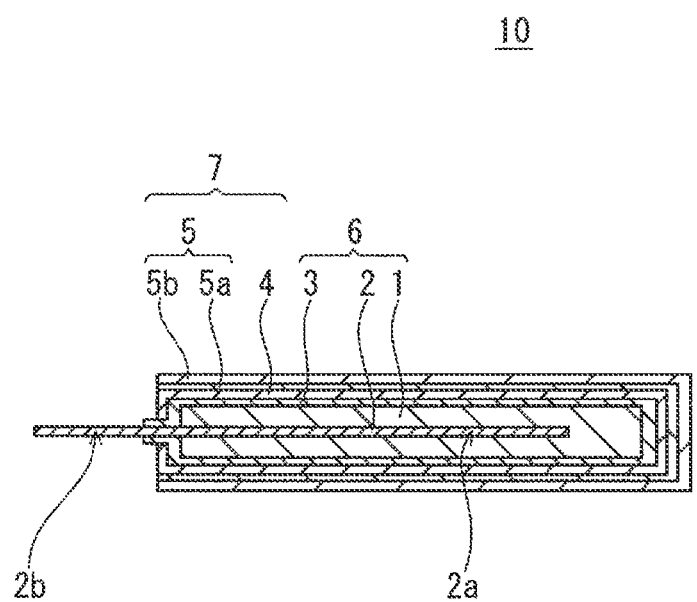
FIG. 11 is a cross-sectional view schematically showing a capacitor element according to an embodiment of the present invention.

FIG. 11 is a cross-sectional view schematically showing an example of the capacitor element according to the present embodiments.

A capacitor element 10 includes an anode section 6 and a cathode section 7. The anode section 6 includes an anode body 1 including a dielectric layer 3, and an anode wire 2. The cathode section 7 includes a solid electrolyte layer 4 formed on the dielectric layer 3, and a cathode layer 5 (a carbon layer 5a and a metal paste layer 5b) that covers the surface of the solid electrolyte layer 4. The anode wire 2 has a first portion 2a embedded into the anode body 1 through one face (implantation face) of the anode body 1, and a second portion 2b extending from the aforementioned one face of the anode body 1.

(Anode Section)

The anode section includes, for example, an anode body, and an anode wire extending from one face of the anode body and electrically connected to an anode lead terminal.

For example, the anode body is a rectangular parallelepiped-shaped porous sintered body obtained by sintering metal particles. As the aforementioned metal particles, particles of a valve metal such as titanium (Ti), tantalum (Ta), or niobium (Nb) are used. For the anode body, one or more kinds of metal particles are used. The metal particles may be an alloy made of two or more metals. For example, an alloy containing a valve metal, silicon, vanadium, boron, and the like can be used. A compound containing a valve metal and a typical element such as nitrogen may be used. The valve metal alloy is mainly composed of a valve metal, and contains, for example, 50 atom % or more of a valve metal.

The anode wire is formed of a conductive material. The material of the anode wire is not particularly limited, and examples thereof include copper, aluminum, and an aluminum alloy, in addition to the above-described valve metal. The materials that form the anode body and the anode wire may be of the same kind or different kinds. The cross-sectional shape of the anode wire is not particularly limited, and examples thereof include a circular shape, a track shape (a shape formed by straight lines parallel to each other, and two curved lines connecting ends of the straight lines), an oval shape, a rectangular shape, and a polygonal shape.

The anode section is produced, for example, by pressure molding powder of the metal particles into a rectangular parallelepiped shape, with the first portion embedded therein, and sintering the molded powder. Accordingly, the second portion of the anode wire is led out from one side of the anode body so as to be implanted. The second portion is joined to the anode lead terminal by welding or the like, whereby the anode wire and the anode lead terminal are electrically connected. The welding method is not particularly limited, and examples thereof include resistance welding and laser welding.

A dielectric layer is formed on the surface of the anode body. The dielectric layer is formed of a metal oxide, for example. Examples of the method for forming a layer containing a metal oxide on the surface of the anode body include a method involving immersing the anode body in a chemical conversion solution to anodize the surface of the anode body, and a method involving heating the anode body under an atmosphere containing oxygen. The dielectric layer is not limited to the above-described layer containing a metal oxide, as long as it is insulating.

(Cathode Section)

The cathode section includes a solid electrolyte layer formed on the dielectric layer, and a cathode layer that covers the solid electrolyte layer.

The solid electrolyte layer may be formed so as to cover at least a portion of the dielectric layer. For the solid electrolyte layer, a manganese compound or a conductive polymer is used, for example. Examples of the conductive polymer include polypyrrole, polythiophene, polyfuran, polyaniline, polyacetylene, polyphenylene, polyparaphenylene vinylene, polyacene, polythiophene vinylene, polyfluorene, polyvinyl carbazole, polyvinyl phenol, polypyridine, or derivatives of these polymers. These may be used alone or in a combination of two or more. The conductive polymer may be a copolymer of two or more monomers. Because of the excellent conductivity, polythiophene, polyaniline, or polypyrrole may be used. In particular, polypyrrole may be used because of the excellent repellency.

The solid electrolyte layer containing the above-described conductive polymer is formed, for example, by polymerizing a raw material monomer on the dielectric layer. Alternatively, the solid electrolyte layer is formed by applying a liquid containing the above-described conductive polymer to the dielectric layer. The solid electrolyte layer is formed by one or more solid electrolyte layers. When the solid electrolyte layer is formed by two or more layers, the compositions and the formation methods (polymerization methods) of the conductive polymers used for the layers may be different.

Note that as used herein, polypyrrole, polythiophene, polyfuran, polyaniline, and the like mean polymers including polypyrrole, polythiophene, polyfuran, polyaniline, and the like, respectively, as basic skeletons thereof. Accordingly, polypyrrole, polythiophene, polyfuran, polyaniline and the like may include derivatives thereof. For example, polythiophene includes poly(3,4-ethylenedioxythiophene).

In order to improve the conductivity of the conductive polymer, various dopants may be added to a polymerization liquid for forming the conductive polymer, a solution or a dispersion of the conductive polymer. Examples of the dopants include, but are not particularly limited to, 1,5-naphthalenedisulfonic acid, 1,6-naphthalenedisulfonic acid, 1-octanesulfonic acid, 1-naphthalenesulfonic acid, 2-naphthalenesulfonic acid, 2,6-naphthalenedisulfonic acid, 2,7-naphthalenedisulfonic acid, 2-methyl-5-isopropylbenzenesulfonic acid, 4-octylbenzenesulfonic acid, 4-nitrotoluene-2-sulfonic acid, m-nitrobenzenesulfonic acid, n-octylsulfonic acid, n-butanesulfonic acid, n-hexanesulfonic acid, o-nitrobenzenesulfonic acid, p-ethylbenzenesulfonic acid, trifluoromethanesulfonic acid, hydroxybenzenesulfonic acid, butylnaphthalenesulfonic acid, benzenesulfonic acid, polystyrenesulfonic acid, polyvinylsulfonic acid, methanesulfonic acid, and derivatives thereof. Examples of the derivatives include metal salts such as a lithium salt, a potassium salt, and a sodium salt, ammonium salts such as a methyl ammonium salt, a dimethyl ammonium salt, and a trimethyl ammonium salt, a piperidium salt, a pyrrolidium salt, and a pyrrolinium salt.

When the conductive polymer is dispersed in the state of particles in a dispersion medium, an average particle size D50 of the particles is, for example, greater than or equal to 0.01 μm and less than or equal to 0.5 μm. When the average particle size D50 of the particles is in this range, the particles can easily penetrate into the anode body.

The cathode layer includes, for example, a carbon layer formed so as to cover the solid electrolyte layer, and a metal paste layer formed on the surface of the carbon layer. The carbon layer contains a conductive carbon material such as graphite, and a resin. The metal paste layer contains, for example, metal particles (e.g., silver) and a resin. Note that the configuration of the cathode layer is not limited to this configuration. The configuration of the cathode layer may be any configuration including a current collecting function.

<Anode Lead Terminal>

One end of the anode lead terminal is joined to the anode wire using a conductive adhesive material or solder, or by resistance welding or laser welding. The other end of the anode lead terminal is led out from the outer package to the outside. A part of the exposed portion of the anode lead terminal is disposed on one of the faces of the outer package, together with the cathode lead terminal.

The material of the anode lead terminal is not particularly limited as long as it is electrochemically and chemically stable, and is conductive. The anode lead terminal may be a metal such as copper, or may be a nonmetal. The shape of the anode lead terminal is not particularly limited as long as it is plate-shaped. In terms of height reduction, the thickness of the anode lead terminal (the length between the principal faces of the anode lead terminal) may be greater than or equal to 25 µm and less than or equal to 200 µm, or may be 25 µm and less than or equal to 100 µm.

The anode lead terminal may be joined to the anode wire using a conductive adhesive material or solder, or may be joined to the anode wire by resistance welding or laser welding. The conductive adhesive material is, for example, a mixture of a thermosetting resin and carbon particles or metal particles, which will be described later.

<Cathode Lead Terminal>

The cathode lead terminal is joined to the cathode layer via a conductive adhesive material, for example. One end of the cathode lead terminal is disposed inside the outer package. The other end of the cathode lead terminal is led out from the outer package to the outside. A part of the exposed portion of the cathode lead terminal is disposed on one of the faces of the outer package, together with the anode lead terminal.

The material of the cathode lead terminal is not particularly limited as long as it is electrochemically and chemically stable, and is conductive. The cathode lead terminal may be a metal such as copper, or may be a nonmetal. The shape of the cathode lead terminal is also not particularly limited, and is long and plate-shaped, for example. In terms of height reduction, the thickness of the cathode lead terminal may be greater than or equal to 25 µm and less than or equal to 200 µm, or may be greater than or equal to 25 µm and less than or equal to 100 µm.

<Outer Package>

The outer package is provided in order to provide electrical insulation between the anode lead terminal and the cathode lead terminal, and is formed of an insulating material (outer package material). The outer package material contains a thermosetting resin, for example. Examples of the thermosetting resin include an epoxy resin, a phenol resin, a silicone resin, a melamine resin, a urea resin, an alkyd resin, a polyurethane, a polyimide, and an unsaturated polyester.

<Method for Producing Electrolytic Capacitor>

Figure 12:
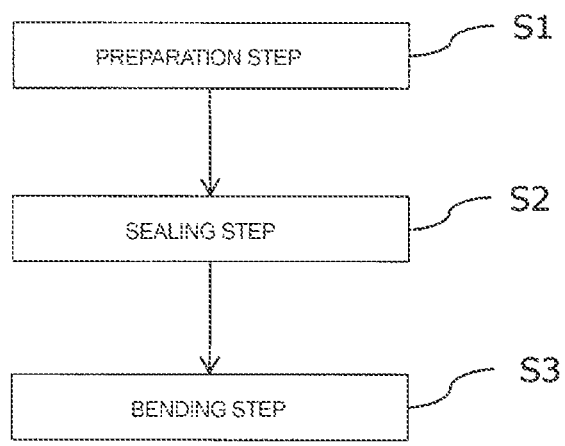
FIG. 12 is a flowchart illustrating a method for producing an electrolytic capacitor according to an embodiment of the present invention.

The electrolytic capacitor is produced, for example, by a method including a preparation step (S1) of preparing a capacitor element to which an anode lead terminal and a cathode lead terminal are connected, a sealing step (S2) of forming an outer package that seals the capacitor element, a portion of the anode lead terminal, and a portion of the cathode lead terminal, and a bending step (S3) of bending an exposed portion exposed from the outer package of the anode lead terminal FIG. 12 is a flowchart illustrating a method for producing an electrolytic capacitor according to the present embodiment.

The method for producing an electrolytic capacitor according to the present embodiment will be described in detail, taking, as an example, a case where the electrolytic capacitor shown in FIGS. 5 and 6 is produced.

Specifically, the outer package includes a second face and a third face sharing one side with the first face and opposing each other, the area of the second face is larger than the area of the third face, the first face, the second face, and the third face each include a planar portion, and the angle θ1 formed between the planar portion of the first face and the planar portion of the second face is less than 90 degrees. The first protruding portion is formed in a virtual space R defined by the planar portion of the first face, a virtual first plane sharing a first side of the first face on the second face side with the first face and forming an angle θ2 greater than the angle θ1 and less than or equal to 90 degrees with the planar portion of the second face, and a virtual third plane coplanar with the planar portion of the third face. The first protruding portion includes a protruding face, and a plurality of rising faces connecting the protruding face and the first face, and the protruding face is coplanar with the virtual first face.

The production method according to the present embodiment is useful for a case such as the one described above where the outside shape of the outer package is tapered, and the outer package includes the first protruding portion.

(1) Preparation Step

First, a capacitor element is prepared.

Valve metal particles and an anode wire are placed in a mold such that a first portion is embedded in the valve metal particles, and the whole is pressure molded, followed by sintering in a vacuum, to produce an anode section in which the first portion is embedded into a porous sintered body through one face of the porous sintered body. The pressure applied during pressure molding is not particularly limited, and is about 10 N or more and 100 N or less, for example. The valve metal particles may be mixed with a binder such as polyacrylic carbonate as needed.

Next, a dielectric layer is formed on the anode body. Specifically, the anode body is immersed in a chemical conversion tank filled with an aqueous electrolytic solution (e.g., an aqueous phosphoric acid solution), a second portion of the anode wire is connected to the anode body placed in the chemical conversion tank, and anodization is performed, whereby a dielectric layer made of an oxide film of the valve metal can be formed on the surface of the anode body. The aqueous electrolytic solution is not limited to an aqueous phosphoric acid solution, and it is possible to use nitric acid, acetic acid, or sulfuric acid, for example.

Subsequently, a solid electrolyte layer is formed. In the present embodiment, a step of forming a solid electrolyte layer containing a conductive polymer is described.

The solid electrolyte layer containing a conductive polymer is formed on at least a portion of the dielectric layer, for example, by a method in which the anode body with the dielectric layer formed thereon is impregnated with a monomer or an oligomer, and thereafter the monomer or the oligomer is polymerized by chemical polymerization or electrolysis polymerization, or a method in which the anode body with the dielectric layer formed thereon is impregnated with a solution or a dispersion of a conductive polymer, and dried.

By applying a carbon paste and a metal paste in order onto the surface of the solid electrolyte layer, a cathode layer composed of a carbon layer and a metal paste layer is formed. The configuration of the cathode layer is not limited thereto as long as the configuration includes a current collecting function.

Through the above-described method, a capacitor element is produced.

Second, an anode lead terminal and a cathode lead terminal are prepared, and joined to the capacitor element.

A bent portion (internal bent portion) that is to be disposed inside the outer package is formed on the anode lead terminal. The internal bent portion is formed, for example, by pressing or the like. The position of the internal bent portion of the anode lead terminal is set as appropriate according to the length, the diameter, and the like of the anode wire. An internal bent portion may also be formed on the cathode lead terminal.

The anode lead terminal and the cathode lead terminal are disposed at predetermined positions. At this time, a conductive adhesive material is applied to a predetermined position of the cathode layer.

The capacitor element is placed on the lead terminals disposed at the predetermined positions. Then, the second portion of the anode wire and the vicinity of one end of the anode lead terminal are joined by laser welding, resistance welding, or the like. At this time, the vicinity of the one end of the cathode lead terminal is joined to the cathode layer via the conductive adhesive material.

Figure 13A:
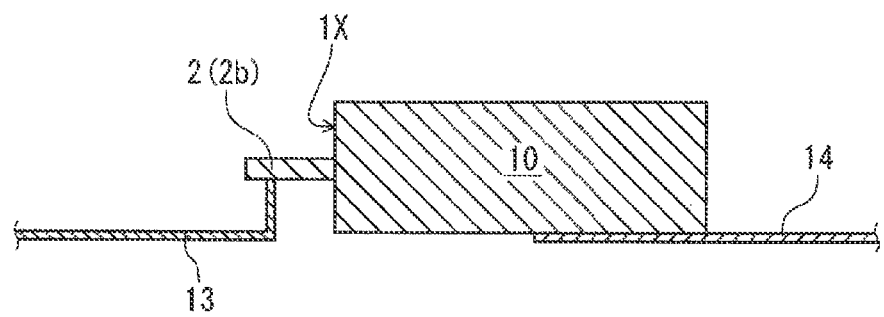
FIG. 13A is a cross-sectional view schematically showing a capacitor element to which lead terminals prepared in a preparation step of the production method according to an embodiment of the present invention are joined.

FIG. 13A is a cross-sectional view schematically showing a capacitor element to which the lead terminals prepared in the preparation step of the production method according to the present embodiment are joined. A capacitor element 10 includes an anode wire 2 implanted through an implantation face 1X. An anode lead terminal 13 is joined to the anode wire 2 (second portion 2b). A cathode lead terminal 14 is joined to a cathode section of the capacitor element 10. A bent portion corresponding to the internal bent portion is formed on the anode lead terminal 13.

(2) Sealing Step

The capacitor element and materials (e.g., an uncured thermosetting resin and a filler) of the outer package are accommodated in a mold, and the capacitor element is sealed by transfer molding, compression molding, or the like. At this time, a portion of the anode lead terminal and a portion of the cathode lead terminal are led out from the mold. The molding conditions are not particularly limited, and the time and temperature conditions may be set as appropriate taking into account the curing temperature or the like of the thermosetting resin.

Figure 13B:
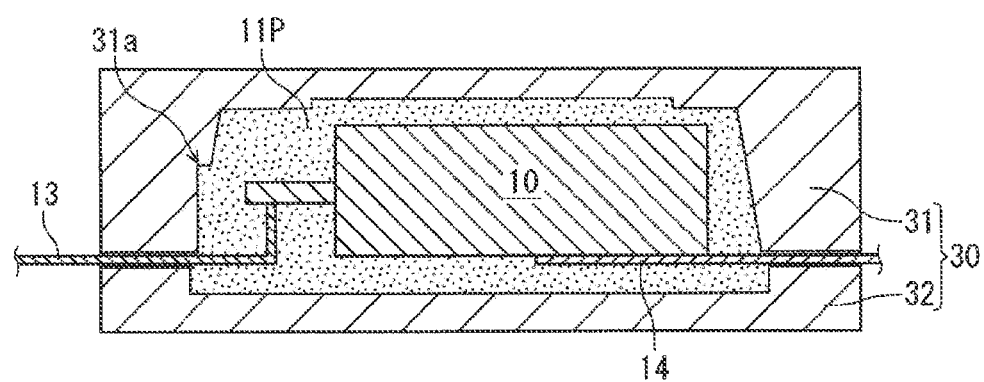
FIG. 13B is a cross-sectional view schematically showing a mold and a capacitor element accommodated in the mold in a sealing step of the production method according to an embodiment of the present invention.

FIG. 13B is a cross-sectional view schematically showing a mold and a capacitor element accommodated in the mold in a sealing step of the production method according to the present embodiment. A capacitor element 10 is accommodated in a mold 30, together with a material 11P of an outer package. A portion of an anode lead terminal 13 and a portion of a cathode lead terminal 14 are led out from the mold 30.

The mold 30 includes a deep first mold 31 capable of accommodating the capacitor element 10, and a second mold 32 including a shallow stepped portion. A recess 31a for forming a first protruding portion is formed in the first mold 31. The bottom face of the first mold 31 has a smaller area than the area of the opening of the first mold 31, and the first mold 31 has a tapered shape. A container-shaped mold 30 is formed by fitting the first mold 31 and the second mold 32 to each other. The anode lead terminal 13 and the cathode lead terminal 14 are led out to the outside from gaps formed when the first mold 31 and the second mold 32 are fitted to each other.

After heating the mold to cure the material of the outer package, the capacitor element covered by the outer package is removed from the mold. This provides an electrolytic capacitor including a capacitor element, an anode lead terminal, a cathode lead terminal, and an outer package that covers the capacitor element and a portion of each of the lead terminals.

Figure 13C:
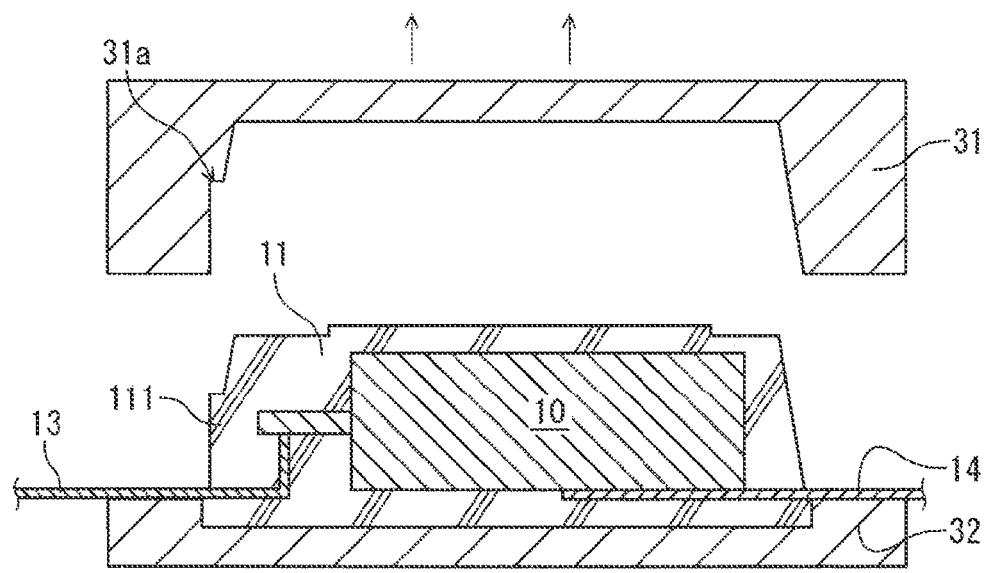
FIG. 13C is a cross-sectional view schematically showing how a first mold is released in the sealing step of the production method according to an embodiment of the present invention.

FIG. 13C is a cross-sectional view schematically showing how the first mold is released in the sealing step of the production method according to the present embodiment. When removing the capacitor element 10, for example, the second mold 32 is fixed, and the first mold 31 is moved in a direction away from the capacitor element 10.

(3) Bending Step

The portion of the anode lead terminal and the portion of the cathode lead terminal that are exposed from the mold are folded, to form respective external bent portions of the lead terminals Consequently, a portion of the anode lead terminal and a portion of the cathode lead terminal are disposed on the third face of the outer package.

Through the above-described method, the electrolytic capacitor shown in FIGS. 5 and 6 is produced.

The anode lead terminal is bent along the virtual first plane (see FIG. 4). At this time, the first protruding portion formed on a side face of the outer package may be used as a guide. For example, a bending roller is moved from the second face toward the third face of the outer package while being pressed against the first protruding portion, thus bending the anode lead terminal. In this case, the bending roller is stably moved, and therefore the accuracy of the bending is increased.

Figure 13D:
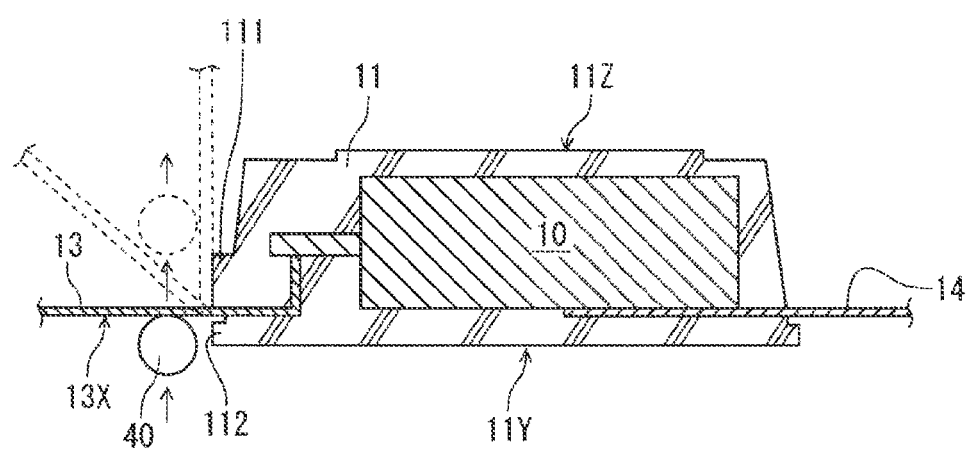
FIG. 13D is a cross-sectional view schematically showing how an anode lead terminal is bent in a bending step of the production method according to an embodiment of the present invention.

FIG. 13D is a cross-sectional view schematically showing how the anode lead terminal is bent in the bending step of the production method according to the present embodiment. A bending roller 40 is moved from the second face (planar portion 11Y) toward the third face (planar portion 11Z) of the outer package 11 while being guided by the first protruding portion 111. The anode lead terminal 13 is pressed by the bending roller 40 and bent into a shape conforming to the virtual first plane. Consequently, the protruding face of the first protruding portion 111 and the outer face 13X of the anode lead terminal 13 are both coplanar with the virtual first plane 11Xv.

Thereafter, the anode lead terminal 13 is further bent along the third face. Similarly, the cathode lead terminal 14 may also be bent using a bending roller.

Figure 14:
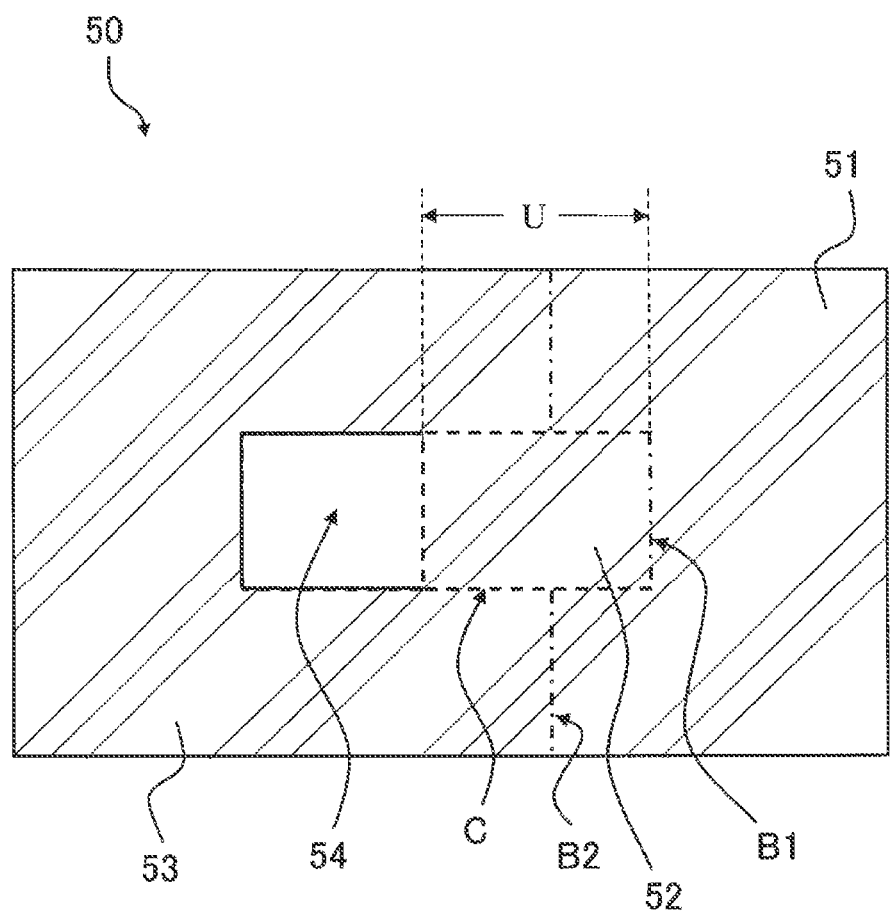
FIG. 14 is a schematic diagram of an anode lead terminal (lead frame) used in production of an electrolytic capacitor according to an embodiment of the present invention.

In the preparation step, the anode lead terminal (anode lead frame) 50 shown in FIG. 14 may be used. Accordingly, the electrolytic capacitor 100 shown in FIG. 9A may be produced. In the anode lead terminal 50, a U-shaped cut C (the portion indicated by the dashed line in FIG. 14) is formed along a contour line of a formation region (e.g., a rectangular region) of the second anode lead portion 52, except for one straight side of the contour line. Punching of the anode lead terminal 50 and the formation of the cut may be performed simultaneously. Of the contour line of the formation region of the second anode lead portion 52, the portion in which no cut is formed constitutes the first bent portion B1. Note that the dashed dotted line in FIG. 14 is a portion serving as an axis for folding.

A length U of the cut may be any length longer than the height of the anode wire 2 from the second face A2. A through hole 54 may be formed adjacent to the cut of the anode lead terminal 50, such that in the sealing step and the bending step, the anode lead terminal (third anode lead portion) is disposed around the first protruding portion of the outer package, and that the anode lead terminal does not cover the first protruding portion.

Next, the formation region of the second anode lead portion 52 is folded using the first bent portion B1 as an axis, thus erecting the second anode lead portion 52 from the anode lead frame. The bent portion is formed, for example, by bending or the like. The position of the first bent portion B1 may be set as appropriate according to the size or the like (in particular, the position of the portion of the capacitor element from which the anode wire 2 is extended) of the capacitor element.

In the bending step, the anode lead terminal 50 is bent from a direction along the second face A2 to a direction along the first face A1, and further bent from the direction along the first face A1 to a direction along the third face A3, which opposes the second face A2. Similarly, the cathode lead terminal is bent from a direction along the second face A2 to a direction along the fourth face A4, and further bent from the direction along the fourth face A4 to a direction along the third face A3, which opposes the second face A2.

In the anode lead frame 50, a boundary between a portion along the first face A1 and a portion along the second face A2 is the second bent portion B2. A portion of the anode lead terminal 50 that extends in a direction away from the outer package 70 with respect to the second bent portion B2 constitutes the third anode lead portion 53. Of a region of the anode lead terminal 50 that is located on the outer package 70 side relative to the second bent portion B2, a portion other than the second anode lead portion 52 constitutes the first anode lead portion 51. Similarly, in the cathode lead terminal 60, a portion of the cathode lead terminal 60 that extends in a direction away from the outer package 70 with respect to a boundary between a portion along the first face A1 and a portion along the fourth face A4 constitutes the second cathode lead portion 62, and the remainder constitutes the first cathode lead portion 61.

INDUSTRIAL APPLICABILITY

The electrolytic capacitor according to the present invention allows the size of a capacitor element to be increased, and therefore can be used in a variety of applications.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST 20, 100 . . . Electrolytic capacitor
10 . . . Capacitor element
1 . . . Anode body
1$x$ . . . Implantation face
2 . . . Anode wire
2$a$ . . . First portion
2$b$ . . . Second portion
3 . . . Dielectric layer
4 . . . Solid electrolyte layer
5 . . . Cathode layer
5$a$ . . . Carbon layer
5$b$ . . . Metal paste layer
6 . . . Anode section
7 . . . Cathode section
8 . . . Conductive adhesive material
11, 70 . . . Outer package
A1 . . . First face
A2 . . . Second face
A3 . . . Third face
A4 . . . Fourth face
11X . . . First face (planar portion)
11Y . . . Second face (planar portion)
11Z . . . Third face (planar portion)
11X$v$ . . . Virtual first plane
11Z$v$ . . . Virtual third plane
11$a$ . . . First side
111 . . . First protruding portion
111$x$ . . . Protruding face
111$y$, 111$z$ . . . Rising face
112 . . . Second protruding portion
11P . . . Material of outer package
71, 72 . . . Protruding portion
13, 50 . . . Anode lead terminal
13X . . . Outer face
51 . . . First anode lead portion
52 . . . Second anode lead portion
53 . . . Third anode lead portion
53$a$ . . . First region
53$b$ . . . Second region
B1 . . . First bent portion
B2 . . . Second bent portion
14, 60 . . . Cathode lead terminal
61 . . . First cathode lead portion
62 . . . Second cathode lead portion
62$a$ . . . First region
62$b$ . . . Second region
30 . . . Mold
31 . . . First mold
31$a$ . . . Recess
32 . . . Second mold
40 . . . Bending roller
210 . . . Capacitor element
202 . . . Anode wire
211 . . . Outer package
211X . . . Side face

The invention claimed is:

1. An electrolytic capacitor comprising:
a capacitor element including an anode section and a cathode section;
an anode lead terminal electrically connected to the anode section;
a cathode lead terminal electrically connected to the cathode section; and
an outer package that covers the capacitor element,
wherein the anode section includes an anode body, and an anode wire extending outwardly of the anode body from an implantation face of the anode body,
the outer package has a first face opposing the implantation face, and a second face and a third face sharing one side with the first face and opposing each other,
the anode lead terminal includes an exposed portion led out to an outside of the outer package from the first face,
the first face, the second face, and the third face each include a planar portion, an area of the second face is larger than an area of the third face,
an angle $\theta 1$ formed between the planar portion of the first face and the planar portion of the second face is less than 90 degrees, the first face includes a protruding portion protruding to an outside of the outer package from the planar portion of the first face, the protruding portion does not overlap the exposed portion when viewed in a normal direction of the planar portion of the first face, the protruding portion is formed in a space defined by the planar portion of the first face, a virtual first plane sharing a first side of the first face on the second face side with the first face and forming an angle $\theta 2$ greater than the angle $\theta 1$ and less than or equal to 90 degrees with the planar portion of the second face, and a virtual third plane coplanar with the planar portion of the third face, and the anode wire extends toward the protruding portion.

2. The electrolytic capacitor according to claim 1, wherein the exposed portion is bent to the third face side at a side portion of the protruding portion, and a part of a face of the exposed portion that faces outward of the outer package is coplanar with a virtual first plane sharing a first side of the first face on the second face side with the first face and forming an angle $\theta 2$ greater than the angle $\theta 1$ and less than or equal to 90 degrees with the second face.

3. The electrolytic capacitor according to claim 1, wherein the first face includes one or more planar portions in addition to the planar portion, and an angle formed between the planar portion of the second face and at least one of the planar portions of the first face having the largest area is less than 90 degrees.

4. The electrolytic capacitor according to claim 1, wherein the anode lead terminal includes:

a first anode lead portion along the second face;

a second anode lead portion rising from the first anode lead portion and being in contact with the anode wire;

a third anode lead portion extending from the first anode lead portion along the first face, thereafter extending along the third face, and exposed from the outer package at least on the third face;

a first bent portion at a boundary between the first anode lead portion and the second anode lead portion; and a second bent portion at a boundary between the first anode lead portion and the third anode lead portion, and the first bent portion is located on the capacitor element side relative to the second bent portion, as viewed in a direction perpendicular to the planar portion of the second face.

5. The electrolytic capacitor according to claim 4, wherein the third anode lead portion includes a first region bent from the first anode lead portion so as to extend along the planar portion of the first face, and a second region bent from the first region so as to extend along the third face, and when the third anode lead portion and the outer package are viewed in a normal direction of the planar portion of the first face, the electrolytic capacitor includes a part in which the first region extends, and a part in which the first region does not extend and only the outer package is present.

6. The electrolytic capacitor according to claim 5, wherein the part in which only the outer package is present is the protruding portion, and the third anode lead portion is exposed from the outer package around the protruding portion.

7. The electrolytic capacitor according to claim 5, wherein the first region and the second region of the third anode lead portion are both exposed from the outer package.

8. The electrolytic capacitor according to claim 4, wherein the third anode lead portion extends along the third face beyond a position of an end of the cathode section on the first face side, as viewed in a direction perpendicular to the second face.

9. The electrolytic capacitor according to claim 1, wherein the protruding portion includes a protruding face extending toward the virtual third plane from the second face side relative to a position in the first face that opposes the anode wire, and protruding from the planar portion of the first face, and a plurality of rising faces connecting the protruding face and the planar portion of the first face.

10. The electrolytic capacitor according to claim 9, wherein the protruding face is coplanar with the virtual first plane.

11. A method for producing an electrolytic capacitor comprising a capacitor element including an anode section and a cathode section; an anode lead terminal electrically connected to the anode section; a cathode lead terminal electrically connected to the cathode section; and an outer package that covers the capacitor element, wherein the anode section includes an anode body, and an anode wire extending outwardly of the anode body from an implantation face of the anode body, the method comprising:

a sealing step of forming the outer package that seals the capacitor element, a portion of the anode lead terminal, and a portion of the cathode lead terminal; and a bending step of bending an exposed portion of the anode lead terminal that is exposed from the outer package, wherein the outer package formed in the sealing step has a first face opposing the implantation face, and a second face and a third face sharing one side with the first face and opposing each other, the first face, the second face, and the third face each include a planar portion, an area of the second face is larger than an area of the third face, an angle $\theta 1$ formed between the planar portion of the first face and the planar portion of the second face is less than 90 degrees, the first face includes a protruding portion protruding to an outside of the outer package from the planar portion of the first face, the first face includes the protruding portion protruding to the outside of the outer package, in a region that does not overlap the exposed portion when viewed in a normal direction of the planar portion of the first face, the protruding portion is formed in a space defined by the planar portion of the first face, a virtual first plane sharing a first side of the first face on the second face side with the first face and forming an angle $\theta 2$ greater than the angle $\theta 1$ and less than or equal to 90 degrees with the planar portion of the second face, and a virtual third plane coplanar with the planar portion of the third face, and in the bending step, the exposed portion of the anode lead terminal is bent using a roller that moves along the protruding portion.

* * * * *